(12) United States Patent
Sawada

(10) Patent No.: US 12,249,950 B2
(45) Date of Patent: Mar. 11, 2025

(54) INSTALLATION STRUCTURE FOR SOLAR CELL MODULE, AND INSTALLATION METHOD FOR SOLAR CELL MODULE

(71) Applicant: KANEKA CORPORATION, Osaka (JP)

(72) Inventor: Toru Sawada, Osaka (JP)

(73) Assignee: KANEKA CORPORATION, Osaka (JP)

( * ) Notice: Subject to any disclaimer, the term of this patent is extended or adjusted under 35 U.S.C. 154(b) by 276 days.

(21) Appl. No.: 17/655,166

(22) Filed: Mar. 16, 2022

(65) Prior Publication Data

US 2022/0209709 A1 Jun. 30, 2022

Related U.S. Application Data

(63) Continuation of application No. PCT/JP2020/031981, filed on Aug. 25, 2020.

(30) Foreign Application Priority Data

Sep. 18, 2019 (JP) .................................. 2019-169748

(51) Int. Cl.
*H02S 20/26* (2014.01)
*E04C 2/00* (2006.01)
(Continued)

(52) U.S. Cl.
CPC ................ *H02S 20/26* (2014.12); *E04C 2/00* (2013.01); *E04F 13/081* (2013.01); *H02S 20/22* (2014.12);
(Continued)

(58) Field of Classification Search
CPC .......... H02S 20/26; H02S 30/10; H02S 40/34; H02S 40/36; E04F 13/081; Y02D 10/10; E02E 10/47; E02E 10/50; E04C 2/00
See application file for complete search history.

(56) References Cited

U.S. PATENT DOCUMENTS 4,433,200 A * 2/1984 Jester .................. H01L 31/0481
136/251
10,036,577 B2 * 7/2018 Mascolo ................. F24S 25/16
(Continued)

FOREIGN PATENT DOCUMENTS

CN 208415612 U 1/2019
CN 209046563 U 6/2019
(Continued)

OTHER PUBLICATIONS

English Translation of JP 3326207 (Year: 2002).*
(Continued)

*Primary Examiner* — Andrew J Triggs
(74) *Attorney, Agent, or Firm* — Studebaker & Brackett PC

(57) ABSTRACT

An installation structure for a solar cell module comprises engagement parts attached to a wall surface; and a plurality of solar cell modules which are installed on the wall surface by engaging with the engagement parts. An upper frame part of the solar cell module has an engaging part for engaging with the engagement parts, and the upper frame part has a hole for letting out a cable from the solar cell module to outside. For vertically adjacent solar cell modules, a space for connecting and installing the cable let out to the outside is present between the upper frame part of the lower solar cell module and a lower frame part of the upper solar cell module.

4 Claims, 15 Drawing Sheets

(51) Int. Cl.
  *E04F 13/08* (2006.01)
  *H02S 20/22* (2014.01)
  *H02S 30/10* (2014.01)
  *H02S 40/34* (2014.01)
  *H02S 40/36* (2014.01)
(52) U.S. Cl.
  CPC .............. *H02S 30/10* (2014.12); *H02S 40/34* (2014.12); *H02S 40/36* (2014.12); *E04F 13/083* (2013.01); *Y02E 10/50* (2013.01)

(56) References Cited

U.S. PATENT DOCUMENTS

| | | | | |
|---|---|---|---|---|
| 2008/0035140 A1* | 2/2008 | Placer | ................... | F24S 25/632 |
| | | | | 126/622 |
| 2017/0040940 A1* | 2/2017 | Ting | ........................ | E04B 2/965 |
| 2017/0133973 A1 | 5/2017 | Mascolo et al. | | |
| 2022/0209709 A1* | 6/2022 | Sawada | ................. | E04F 13/083 |

FOREIGN PATENT DOCUMENTS

| | | | |
|---|---|---|---|
| JP | H06-069527 | A | 3/1994 |
| JP | 3326207 | B2 * | 9/2002 |
| JP | 2014-145159 | A | 8/2014 |
| JP | 2014-232740 | A | 12/2014 |
| JP | 5778090 | B2 | 9/2015 |
| JP | 2016-089353 | A | 5/2016 |
| JP | 6190613 | B2 | 8/2017 |
| JP | 6433058 | B2 | 12/2018 |
| JP | 2021017766 | A * | 2/2021 |

OTHER PUBLICATIONS

Translation of JP 2014-15751 (Year: 2012).*
International Search Report issued in PCT/JP2020/031981; mailed Nov. 10, 2020.

* cited by examiner

INSTALLATION STRUCTURE FOR SOLAR CELL MODULE, AND INSTALLATION METHOD FOR SOLAR CELL MODULE

CROSS-REFERENCE TO RELATED APPLICATIONS

This application claims benefit of priority to International Patent Application No. PCT/JP2020/031981, filed Aug. 25, 2020, and to Japanese Patent Application No. 2019-169748, filed Sep. 18, 2019, the entire contents of each are incorporated herein by reference.

BACKGROUND

Technical Field

The present disclosure relates to a solar cell module installation structure, and a solar cell module installation method.

Background Art

A structure in which solar cell modules are installed with a two-dimensional shape on a wall surface of a construction such as a building is known, as described, for example, in Japanese Patent No. 5778090, Japanese Patent No. 6190613 and Japanese Patent No. 6433058. With the solar cell module installation structures described in Japanese Patent No. 5778090, Japanese Patent No. 6190613 and Japanese Patent No. 6433058, an upper frame of a solar cell module is hung on a wall surface of a construction, and the solar cell module is made to be rotatable such that a lower frame of the solar cell module separates from the wall surface with the upper frame as a fulcrum. As a result, cable connection work on the back side of the solar cell module becomes easier.

SUMMARY

With the solar cell module installation structures described in Japanese Patent No. 5778090, Japanese Patent No. 6190613 and Japanese Patent No. 6433058, a worker goes behind a solar cell module in a state where a large solar cell module is made to be slanted from a wall surface in order to perform cable connection work, and, in addition to the cable connection work being complicated, it is difficult to say that safety is high.

Accordingly, the present disclosure provides a solar cell module installation structure and a solar cell module installation method which are able to improve the ease and safety of cable connection work for solar cell modules.

A solar cell module installation structure according to the present disclosure is a structure with which a plurality of solar cell modules are two-dimensionally installed onto a wall surface of a construction, the structure including an engagement part that is attached to the wall surface; and a plurality of solar cell modules that are installed onto the wall surface by engaging with the engagement part. Each of the plurality of solar cell modules includes a solar cell panel, a frame that supports a periphery of the solar cell panel, and a cable for extracting an output from the solar cell panel. An upper frame part in the frame has an engaging part for engaging with the engagement part. The upper frame part or a lower frame part in the frame has a hole for letting out the cable to outside the solar cell module. A space for connecting and installing the cable let out to outside each solar cell module is provided between the upper frame part of a lower solar cell module from among solar cell modules adjacent in a vertical direction and the lower frame part of an upper solar cell module from among the solar cell modules adjacent in the vertical direction.

Another solar cell module installation structure according to the present disclosure is a structure with which a plurality of solar cell modules are two-dimensionally installed onto a wall surface of a construction. The structure includes an engagement part that is attached to the wall surface; and a plurality of solar cell modules that are installed onto the wall surface by engaging with the engagement part. Each of the plurality of solar cell modules includes a solar cell panel, a frame that supports a periphery of the solar cell panel, and a cable for extracting an output from the solar cell panel. An upper frame part in the frame has an engaging part for engaging with the engagement part. Each of the plurality of solar cell modules further includes at least two intermediate members that are interposed between the engagement part on the wall surface and the engaging part in the solar cell module and that form a gap for letting out the cable to outside the solar cell module. A space for connecting and installing the cable let out to outside each solar cell module is provided between the upper frame part of a lower solar cell module from among solar cell modules adjacent in a vertical direction and the lower frame part of an upper solar cell module from among the solar cell modules adjacent in the vertical direction.

A solar cell module installation method according to the present disclosure is a method for, in an aforementioned solar cell module installation structure, two-dimensionally installing a plurality of solar cell modules onto a wall surface of a construction. The method includes at each of the plurality of solar cell modules, letting out the cable from the hole in the upper frame part or the lower frame part to outside; installing the plurality of solar cell modules onto the wall surface by causing an engaging part in each of the plurality of solar cell modules to engage with the engagement part on the wall surface; and connecting and installing the cable, let out to outside each solar cell module, in a space between the upper frame part of a lower solar cell module from among solar cell modules adjacent in a vertical direction and the lower frame part of an upper solar cell module from among the solar cell modules adjacent in the vertical direction.

Another solar cell module installation method according to the present disclosure is a method for, in the aforementioned another solar cell module installation structure, two-dimensionally installing a plurality of solar cell modules onto a wall surface of a construction. The method includes installing the plurality of solar cell modules onto the wall surface by causing an engaging part in each of the plurality of solar cell modules to engage, via the at least two intermediate members, with the engagement part on the wall surface; and at each of the plurality of solar cell modules, letting out the cable to outside from a gap between the intermediate members, the gap being between the engagement part on the wall surface and the engaging part in the solar cell module. The method further includes connecting and installing the cable, let out to outside each solar cell module, in a space between the upper frame part of a lower solar cell module from among solar cell modules adjacent in a vertical direction and the lower frame part of an upper solar cell module from among the solar cell modules adjacent in the vertical direction.

By virtue of the present disclosure, it is possible to improve the ease and safety of cable connection work for solar cell modules.

DETAILED DESCRIPTION

Figure 1:
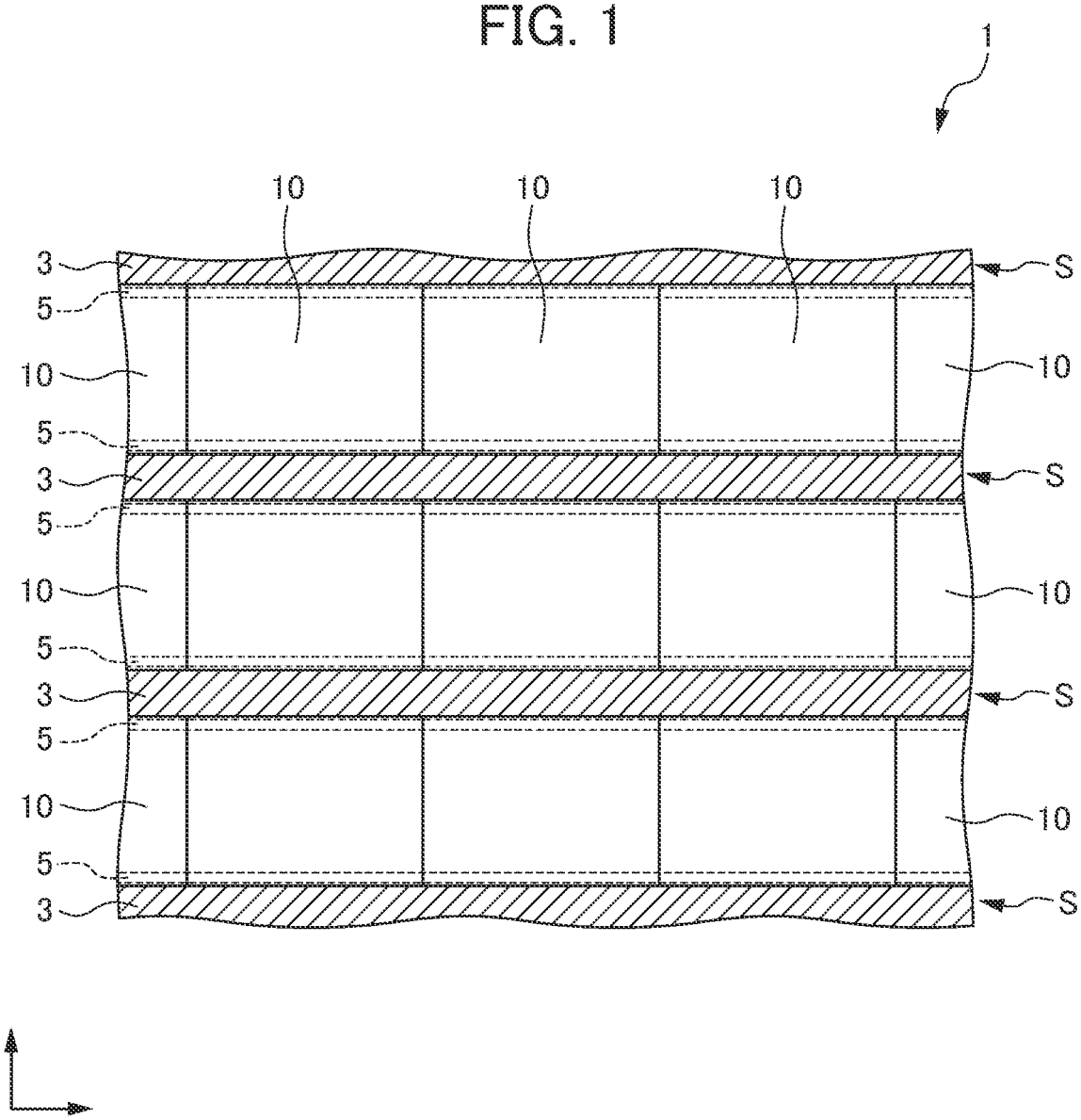
FIG. 1 is a view illustrating a solar cell module installation structure according to the present embodiment.

With reference to the attached drawings, description is given below regarding an example of an embodiment of the present disclosure. Note that the same reference symbol is applied to the same or corresponding portions in the drawings. For convenience, there are cases where hatching, member symbols, etc. are omitted, but in these cases other drawings are to be referred to.

Figure 2:
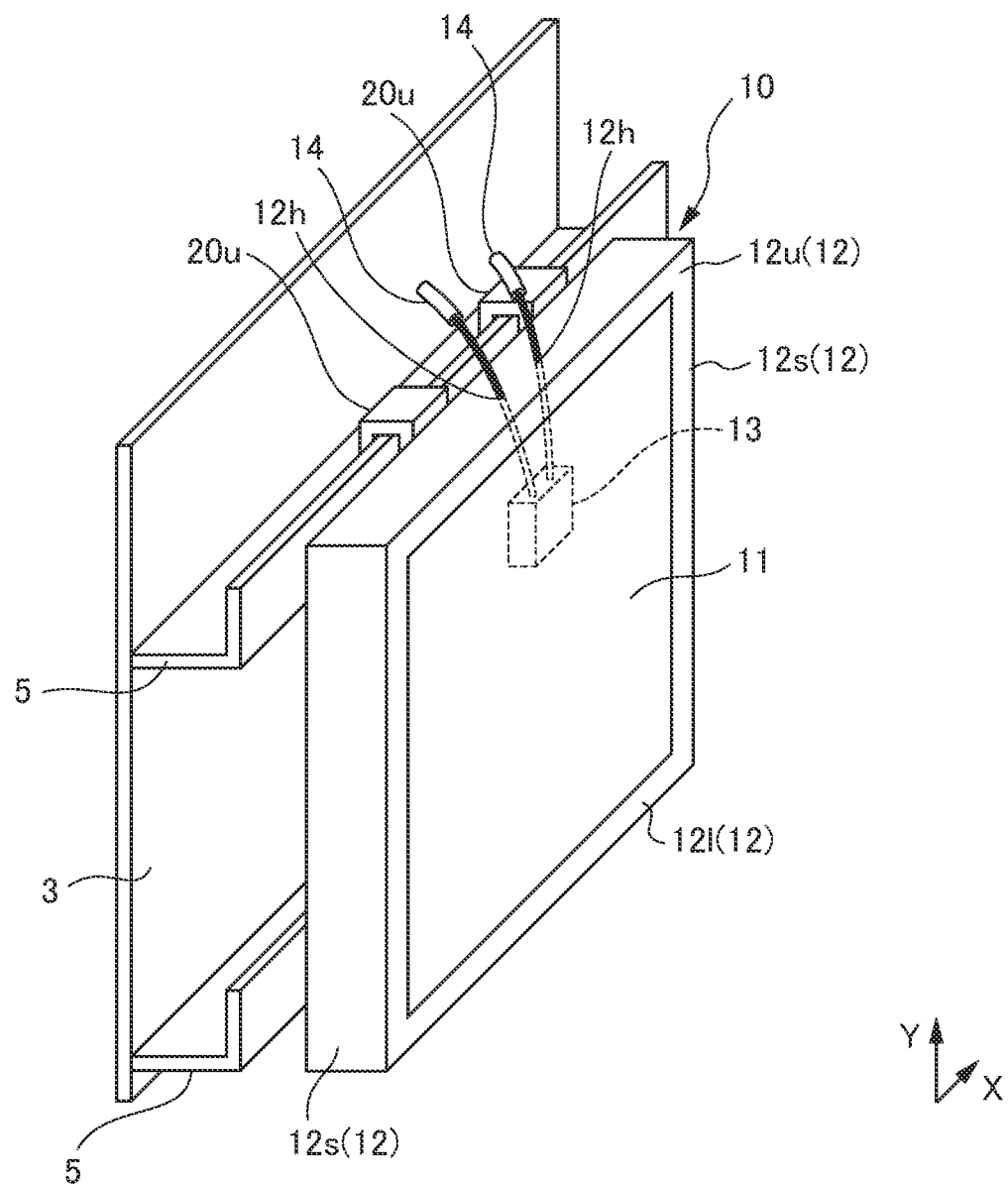
FIG. 2 is a perspective view illustrating, in an enlarged manner, a portion of the solar cell module installation structure illustrated in FIG. 1.
Figure 3:
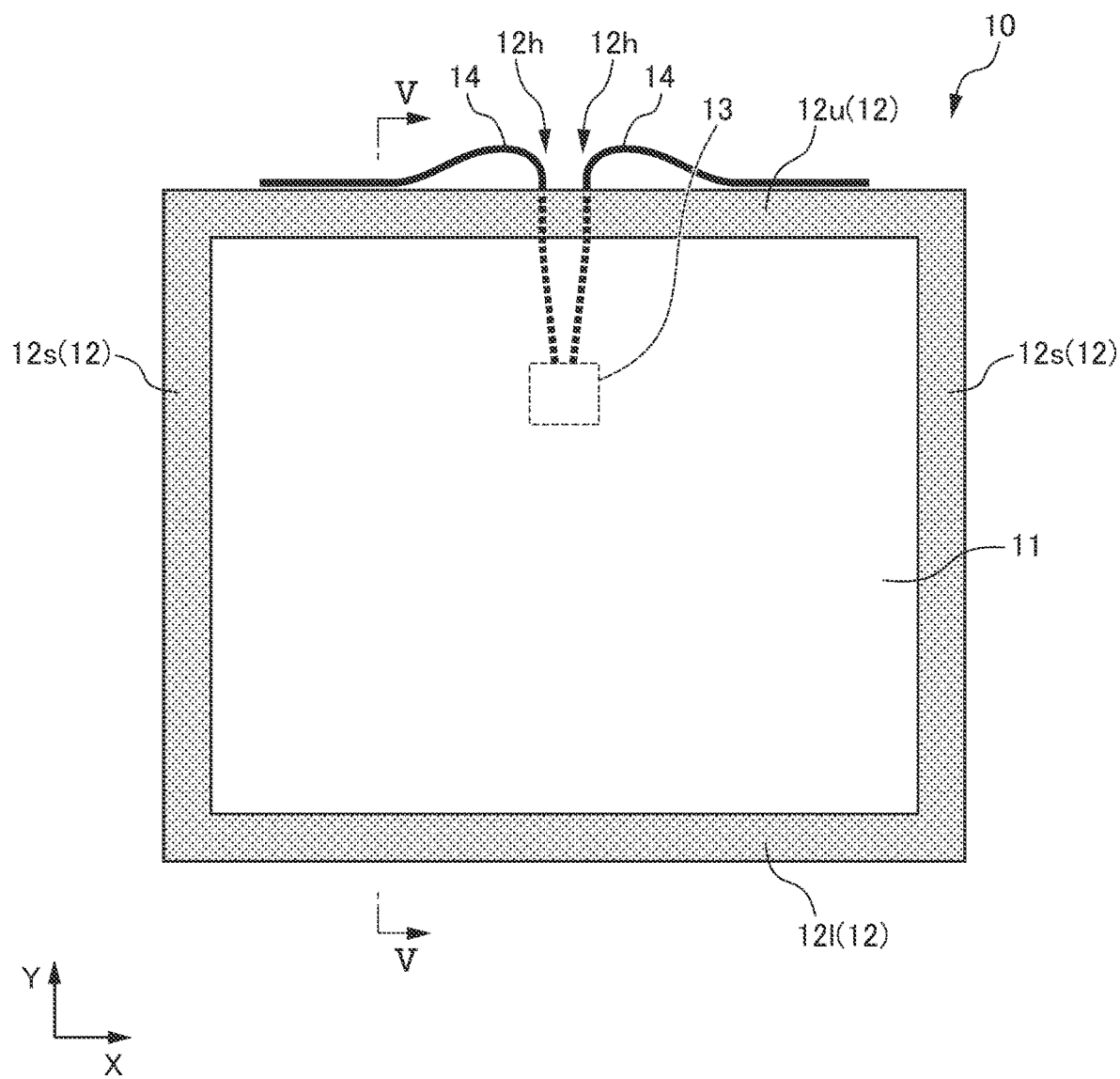
FIG. 3 is view in which the enlarged portion of the solar cell module installation structure illustrated in FIG. 2 is seen from in front.
Figure 4:
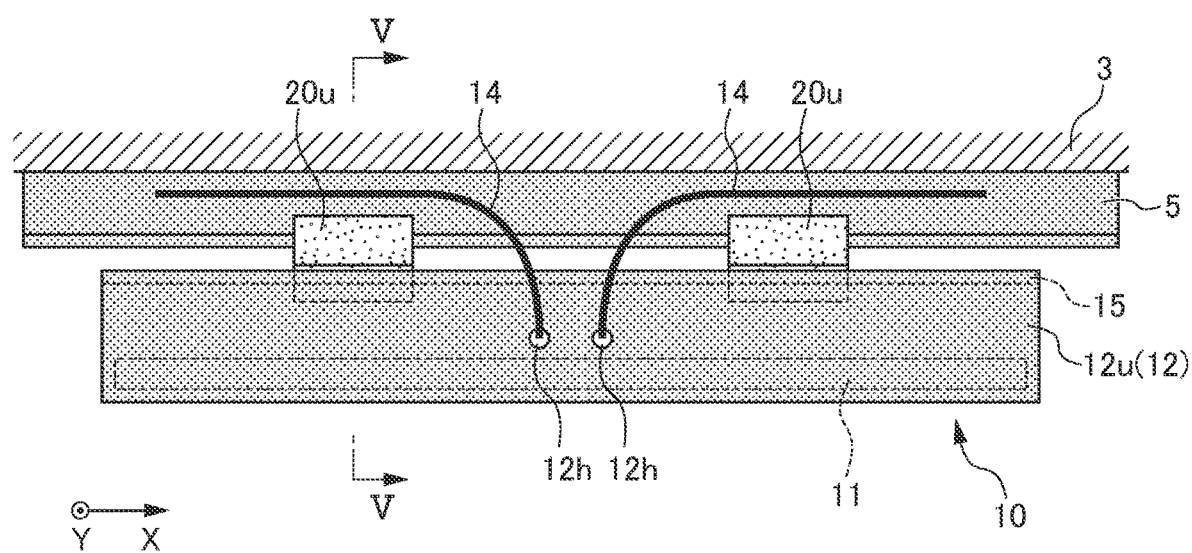
FIG. 4 is view in which the enlarged portion of the solar cell module installation structure illustrated in FIG. 3 is seen from above.
Figure 5:
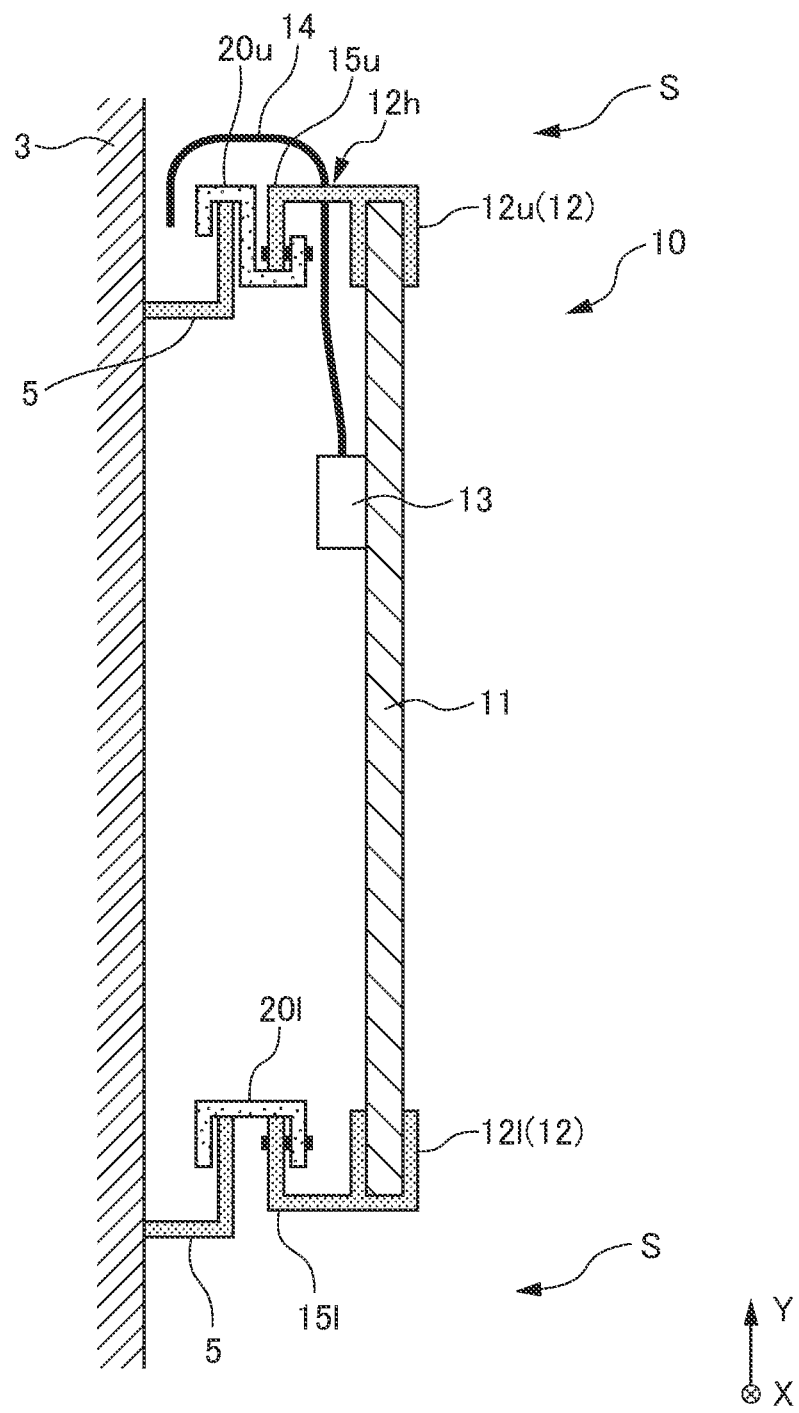
FIG. 5 is a V-V line cross section of the enlarged portion of the solar cell module installation structure illustrated in FIGS. 3 and 4.

FIG. 1 is a view illustrating a solar cell module installation structure according to the present embodiment. FIG. 2 is a perspective view illustrating, in an enlarged manner, a portion of the solar cell module installation structure illustrated in FIG. 1. FIG. 3 is a view of the enlarged portion of the solar cell module installation structure illustrated in FIG. 2, seen from in front. FIG. 4 is a view of the enlarged portion of the solar cell module installation structure illustrated in FIG. 3, seen from above. FIG. 5 is a V-V line cross section of the enlarged portion of the solar cell module installation structure illustrated in FIGS. 3 and 4. FIGS. 1 to 5 and drawings described below indicate an XY Cartesian coordinate system. An XY plane is a surface that follows a wall surface of a construction as well as a light receiving surface and a back surface of a solar cell module (and a solar cell panel described below), with the X direction being the horizontal direction and the Y direction being the vertical direction.

As illustrated in FIGS. 1 to 5, a solar cell module installation structure 1 is a structure in which a plurality of solar cell modules 10 are two-dimensionally installed on a wall surface 3 of a construction such as a building (for example, a tall ferro-concrete building). Specifically, the solar cell module installation structure 1 includes a plurality of horizontal bars (engagement parts) 5 attached to the wall surface 3, and a plurality of solar cell modules 10 attached to the horizontal bars 5.

Each horizontal bar 5 extends in a horizontal direction (X direction) and a cross-section thereof intersecting with the X direction has an L-shape which is a hook shape that protrudes on an upper side. The horizontal bars 5 are attached to the wall surface 3 and separated from each other in a vertical direction (Y direction). Material for the horizontal bars 5 is not particularly limited, but, in consideration of the weight of each solar cell module 10, may be a metal material, for example.

Each solar cell module 10 is installed onto the wall surface 3 by engaging with horizontal bars 5. A solar cell module 10 includes a solar cell panel 11, a frame 12 for supporting the periphery of the solar cell panel 11, and a terminal box 13 and cables 14 for extracting electric power which is generated and outputted by the solar cell panel 11.

The solar cell panel 11 covers a light receiving surface side and a back surface side of a solar cell with a glass plate or a translucent resin plate, and is sealed with a resin. The periphery of the solar cell panel 11 is covered by the frame 12. The terminal box 13 is provided on the back side of the solar cell panel 11. The cables 14 extend from the terminal box 13, and are let out externally from the solar cell module 10 via holes (details thereof are described below) in the frame 12.

The frame 12 includes an upper frame part 12u for supporting an upper edge of the solar cell panel 11, a lower frame part 12l for supporting a lower edge of the solar cell panel 11, and left and right side frame parts 12s for respectively supporting left and right edges of the solar cell panel 11. Material for the frame 12 is not particularly limited, but, in consideration of the weight of each solar cell module 10, may be a metal material, for example.

The upper frame part 12u has an upper engaging part (engaging part) 15u for engaging with a horizontal bar (engagement part) 5 on the wall surface 3. Similarly, the lower frame part 12l has a lower engaging part 15l for engaging with a horizontal bar 5 on the wall surface 3.

The upper engaging part 15u extends in the horizontal direction (X direction), and a cross-section thereof intersecting with the X direction has an L-shape which is a hook shape that protrudes on a lower side. In contrast, the lower engaging part 15l extends in the horizontal direction (X direction), and a cross-section thereof intersecting with the X direction has an L-shape which is a hook shape that protrudes on an upper side. Material for the upper engaging part 15u and the lower engaging part 15l is not particularly limited, but, in consideration of the weight of each solar cell module 10, may be a metal material, for example.

The upper engaging part 15u, via one or more upper intermediate members (intermediate members) 20u, engages with a horizontal bar 5 on the wall surface 3 in a manner that enables the upper engaging part 15u to move in the horizontal direction. Similarly, the lower engaging part 15l, via one or more lower intermediate members 20l, engages with a horizontal bar 5 on the wall surface 3 in a manner that enables the lower engaging part 15l to move in the horizontal direction.

Figure 7:
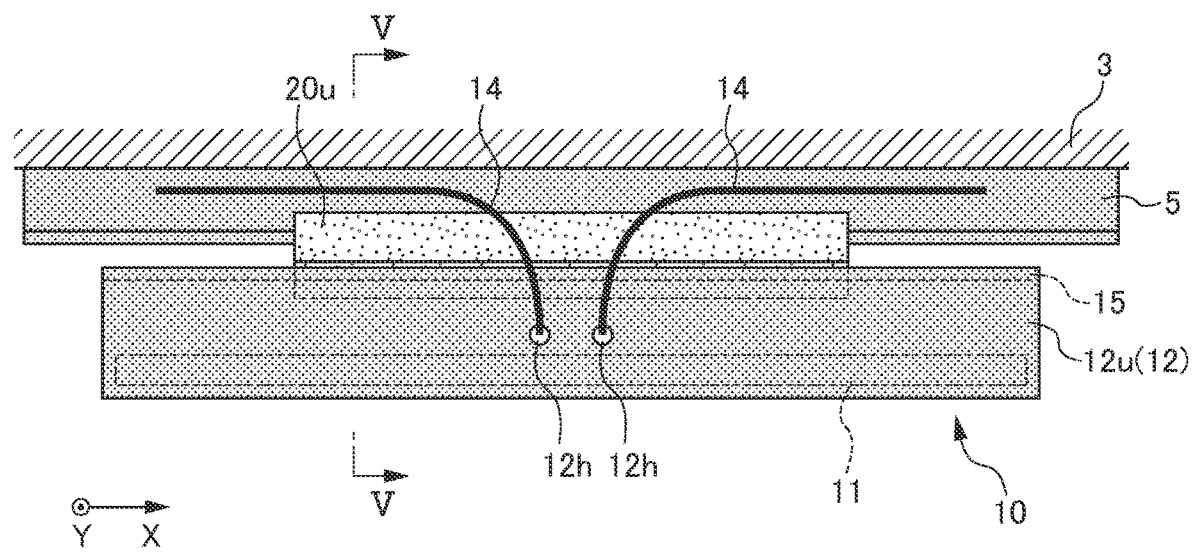
FIG. 7 is a view in which an enlarged portion corresponding to FIG. 4 of a solar cell module installation structure according to a variation of the present embodiment is seen from above.

Each upper intermediate member 20u is interposed between the horizontal bar 5 on the wall surface 3 and the upper engaging part 15u in the solar cell module 10. The upper intermediate member 20u extends in the horizontal direction (X direction) and a cross-section thereof intersecting the X direction has an S-shape. As the upper intermediate member 20u, a plurality of intermediate members having short shapes as illustrated in FIG. 4 may be used, or one intermediate member having a long shape as illustrated in FIG. 7 may be used. When there is a plurality of upper intermediate members 20u with short shapes, it is possible to reduce the raw material cost for the intermediate members. In contrast, when there is one upper intermediate member 20u with a long shape, there is improved ability to perform work in a case of hooking the solar cell module 10 onto horizontal bars 5 and making it possible to slide the solar cell module 10 in the horizontal direction, following the wall surface 3.

Each lower intermediate member 20l is interposed between a horizontal bar 5 on the wall surface 3 and the lower engaging part 15l in the solar cell module 10. The lower intermediate member 20l extends in the horizontal direction (X direction), and a cross-section thereof intersecting the X direction has an angular U-shape. Similarly to the upper intermediate member 20u described above, as the lower intermediate member 20l, a plurality of intermediate members having short shapes may be used, or one intermediate member having a long shape may be used.

Material for each upper intermediate member 20u and lower intermediate member 20l is not particularly limited, but, in consideration of the weight of each solar cell module 10, may be a metal material, for example.

Each upper intermediate member 20u and the upper engaging part 15u may be fastened by a fixing member such as a screw. In contrast, each upper intermediate member 20u and the horizontal bar 5 are not fastened by a fixing member. Similarly, each lower intermediate member 20l and the lower engaging part 15l may be fastened by a fixing member such as a screw. In contrast, each lower intermediate member 20l and the horizontal bar 5 are not fastened by a fixing member. As a result, the solar cell module 10 is installed on the wall surface 3 in manner such that the solar cell module 10 can move in the horizontal direction (X direction).

In addition, the upper frame part 12u has holes 12h for letting out the cables 14 to outside the solar cell module 10.

For solar cell modules 10, 10 adjacent to each other in the vertical direction (Y direction), there is a space S between the upper frame part 12u of the lower solar cell module 10 and the lower frame part 12l of the upper solar cell module 10, the space S being for connecting and installing (running) cables 14 which are let out to outside a solar cell module 10. The space S, in other words the width in the Y direction of a gap between solar cell modules 10, 10 adjacent to each other in the vertical direction (Y direction), is 10 mm to 50 mm (inclusive).

Figure 6:
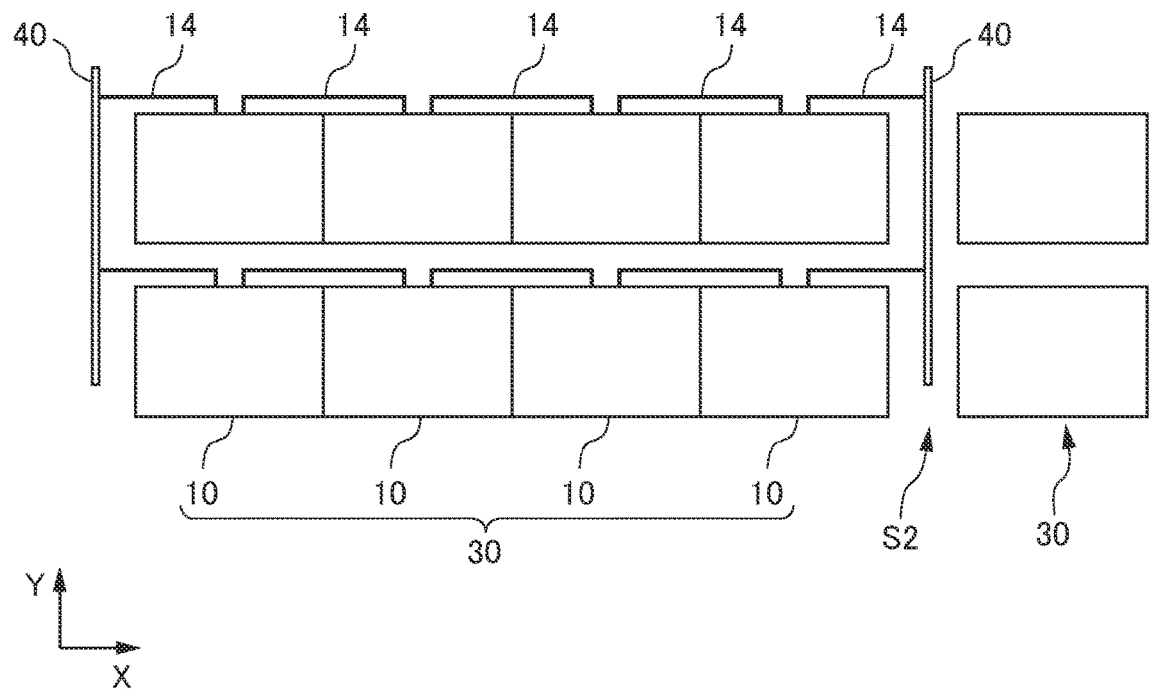
FIG. 6 is a schematic view of an example of cable connections in the solar cell module installation structure according to the present embodiment.

FIG. 6 is a schematic view of an example of cable connections in the solar cell module installation structure according to the present embodiment. As illustrated in FIG. 6, for example four or five solar cell modules 10 lined up in the horizontal direction (X direction) are connected in series. The four or five solar cell modules connected in series are taken as a unit string 30, and a plurality of unit strings 30 lined up in the vertical direction (Y direction) are connected in parallel. In this case, it may be that a gap (space) S2 is provided between unit strings 30, 30 adjacent in the horizontal direction (X direction), and a common bus wire 40 which extends in the vertical direction (Y direction) is installed, whereby the unit strings 30 are connected in parallel. As a result, the ability to perform cable connection work improves.

In contrast, it may be that the cables 14 of solar cell modules connected in series are disposed in the horizontal bars 5 in the gap between solar cell modules 10, 10 adjacent in the vertical direction (Y direction), in other words in the space S. As a result, it is possible to obscure the cables 14. Note that cables 14 may be disposed above an upper frame part 12u on a solar cell module 10. In this case, a veneer for obscuring the space S may be provided (for example, refer to FIGS. 13 to 15 described below).

Next, description is given regarding a solar cell module installation method according to the present embodiment. Firstly, a plurality of horizontal bars 5 are attached to the wall surface 3 of the construction so as to extend in the horizontal direction (X direction) and be separated in the vertical direction (Y direction).

Next, in a plurality of solar cell modules 10, the cables 14 are let out to outside from the holes 12h in the upper frame parts 12u. Specifically, the cables 14 are let out to outside of the solar cell modules 10 through the holes 12h in the upper frame parts 12u.

Next, the upper engaging parts 15u and lower engaging parts 15l in the plurality of solar cell modules 10 are caused to engage with the horizontal bars 5 on the wall surface 3, whereby the plurality of solar cell modules 10 are installed onto the wall surface 3 in a manner that enables the plurality of solar cell modules 10 to move in the horizontal direction. Specifically, each solar cell module 10 is installed onto the wall surface 3 so that the upper engaging part 15u in the upper frame part 12u in the solar cell module 10 engages with a horizontal bar 5 via the upper intermediate member 20u in a manner that enables the upper engaging part 15u to move in the horizontal direction, and the lower engaging part 15l in the lower frame part 12l engages with a horizontal bar 5 via the lower intermediate member 20l in a manner that enables the lower engaging part 15l to move in the horizontal direction. At this time, the solar cell modules are installed onto the wall surface in an order from below in the vertical direction.

Next, for solar cell modules 10, 10 adjacent to each other in the vertical direction (Y direction), in the space S between the upper frame part 12u of the lower solar cell module 10 and the lower frame part 12l of the upper solar cell module 10, cables 14 which are let out to outside a solar cell module 10 are connected and installed (run).

As described above, by virtue of the solar cell module installation structure 1 according to the present embodiment, the cables 14 are let out from the holes 12h in the upper frame part 12u of each solar cell module 10, and there is a space S between solar cell modules 10, 10 which are adjacent in the vertical direction (Y direction). As a result, in the gap (space S) between the solar cell modules 10, 10 adjacent in the vertical direction (Y direction), it is possible to connect and install (run) cables 14 from a solar cell module 10. In other words, there is no need to make a solar cell module be slanted and then perform cable connection work on the rear surface of the solar cell module. As a result, it is possible to improve the ease and safety of cable connection work for a type of general-purpose solar cell module which is hooked onto a wall surface.

In addition, by virtue of the solar cell module installation structure 1 according to the present embodiment, because each horizontal bar 5 on the wall surface 3 and each upper engaging part 15u on a solar cell module 10 has a cross-sectional L-shape, it is possible to improve the ease of attaching a type of general-purpose solar cell module which is hooked onto a wall surface.

In addition, by virtue of the solar cell module installation structure 1 according to the present embodiment, because each horizontal bar 5 on the wall surface 3 extends in the horizontal direction and each solar cell module 10 is installed in a manner that enables the solar cell module 10 to move in the horizontal direction, it is possible to improve the ease of replacing (in other words, removing and attaching) a type of general-purpose solar cell module which is hooked onto a wall surface.

Description was given above regarding an embodiment of the present disclosure, but the present disclosure is not limited to the embodiment described above, and various modifications and variations are possible. For example, in the embodiment described above, holes 12h for letting out the cables 14 are provided in the upper frame part 12u on a solar cell module 10. However, a feature of the present disclosure is not limited to this, and a hole 12h for letting out a cable 14 may be provided in the lower frame part 121 in a solar cell module 10.

In a form where holes 12h are provided in the upper frame part 12u in a solar cell module 10 as in the embodiment described above, when solar cell modules 10 are disposed going up from below in the wall surface 3, it is possible to place the cables 14 on the upper frame part 12u, and there is good workability for cable connections.

In contrast, in a form where holes are provided in the lower frame part 121 on a solar cell module 10, because the cables 14 droop, when solar cell modules 10 are disposed going down from above for the wall surface 3, the cables 14 are sandwiched between the solar cell modules 10 and the wall surface 3, and there is bad workability for cable connections. However, even in this form, when solar cell modules 10 are disposed going up from below for the wall surface 3, the cables 14 droop onto the front side of the lower solar cell module 10. If the cables 14 are pushed into the gap (space S) between solar cell modules 10 after the cables are connected to each other, the workability of cable connections improves.

Figure 8:
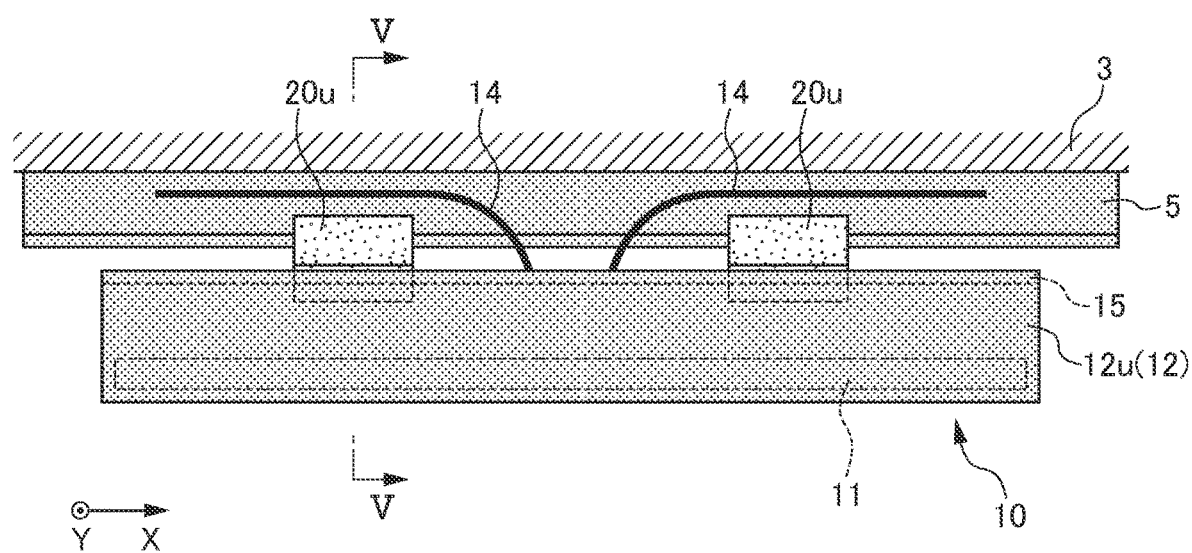
FIG. 8 is a view in which an enlarged portion corresponding to FIG. 4 of a solar cell module installation structure according to a variation of the present embodiment is seen from above.

Note that, in a case where upper intermediate members 20u have a plurality of short shapes as illustrated in FIG. 8, the cables 14 may be let out from a gap between upper intermediate members 20u, this gap also being between a horizontal bar 5 on the wall surface 3 and the upper engaging part 15u in the solar cell module 10. In this case, there is no need to provide holes 12h in the upper frame part 12u.

Figure 9:
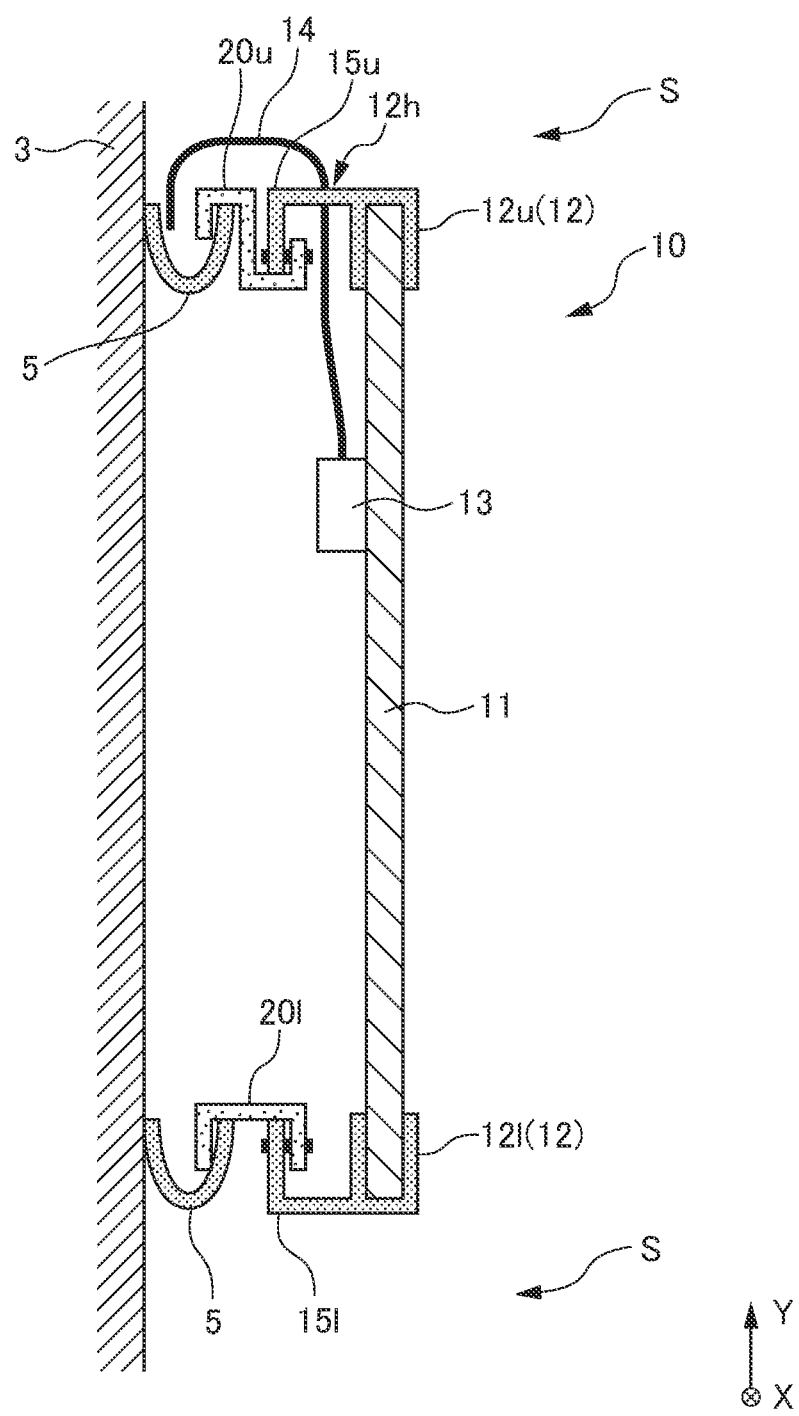
FIG. 9 is a cross-sectional view of an enlarged portion corresponding to FIG. 5 of a solar cell module installation structure according to a variation of the present embodiment.
Figure 10:
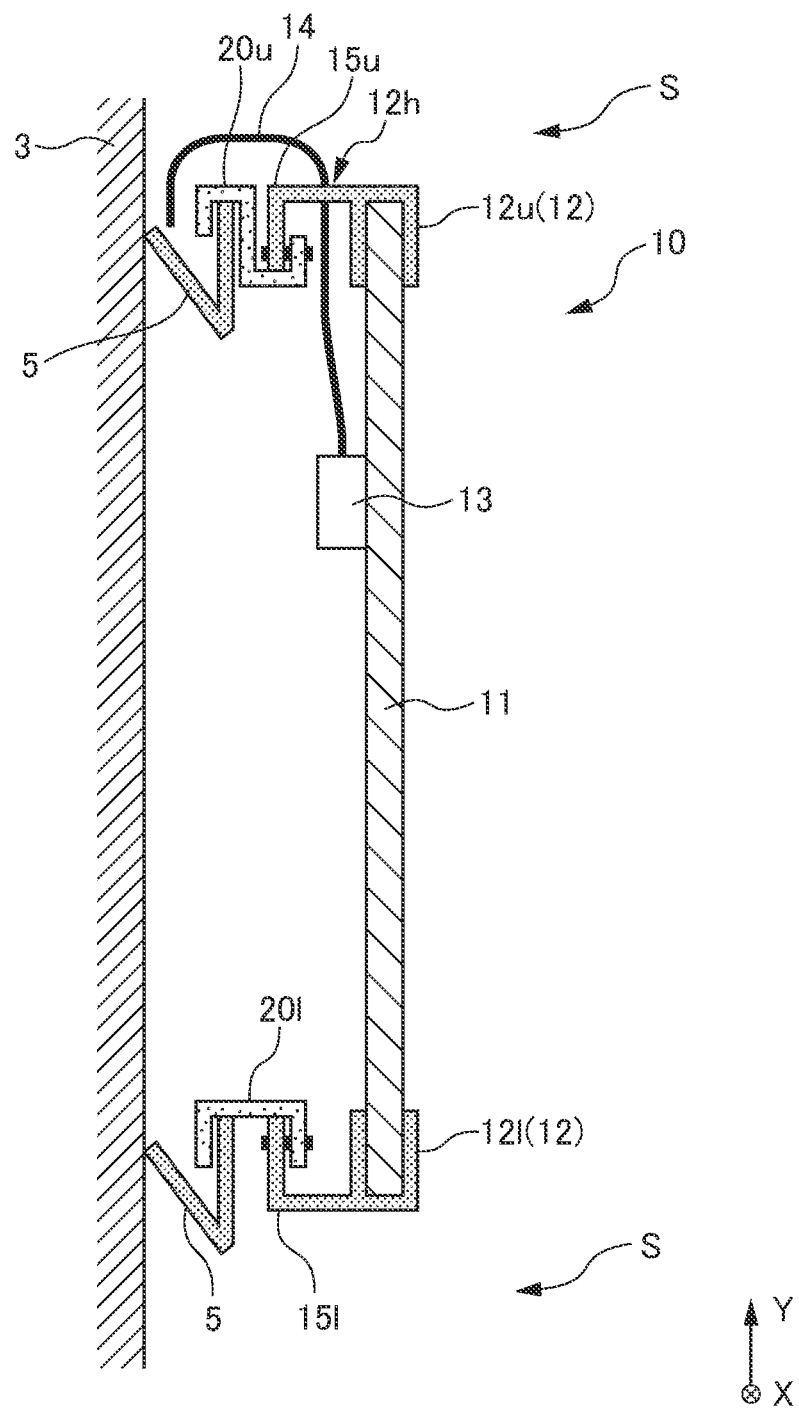
FIG. 10 is a cross-sectional view of an enlarged portion corresponding to FIG. 5 of a solar cell module installation structure according to a variation of the present embodiment.

In addition, in the embodiment described above, horizontal bars 5 having a cross-sectional L-shape were exemplified. However, a horizontal bar is not limited to this, and it may be that a cross-section of a horizontal bar intersecting with the X direction has a U-shape as illustrated in FIG. 9 or a cross-section of a horizontal bar intersecting with the X direction has a V-shape as illustrated in FIG. 10.

In addition, in the embodiment described above, the upper intermediate member 20u having a cross-sectional S-shape was exemplified. However, an upper intermediate member 20u is not limited to this, and a cross-section of the upper intermediate member 20u intersecting with the X direction may have a N-shape.

Figure 11:
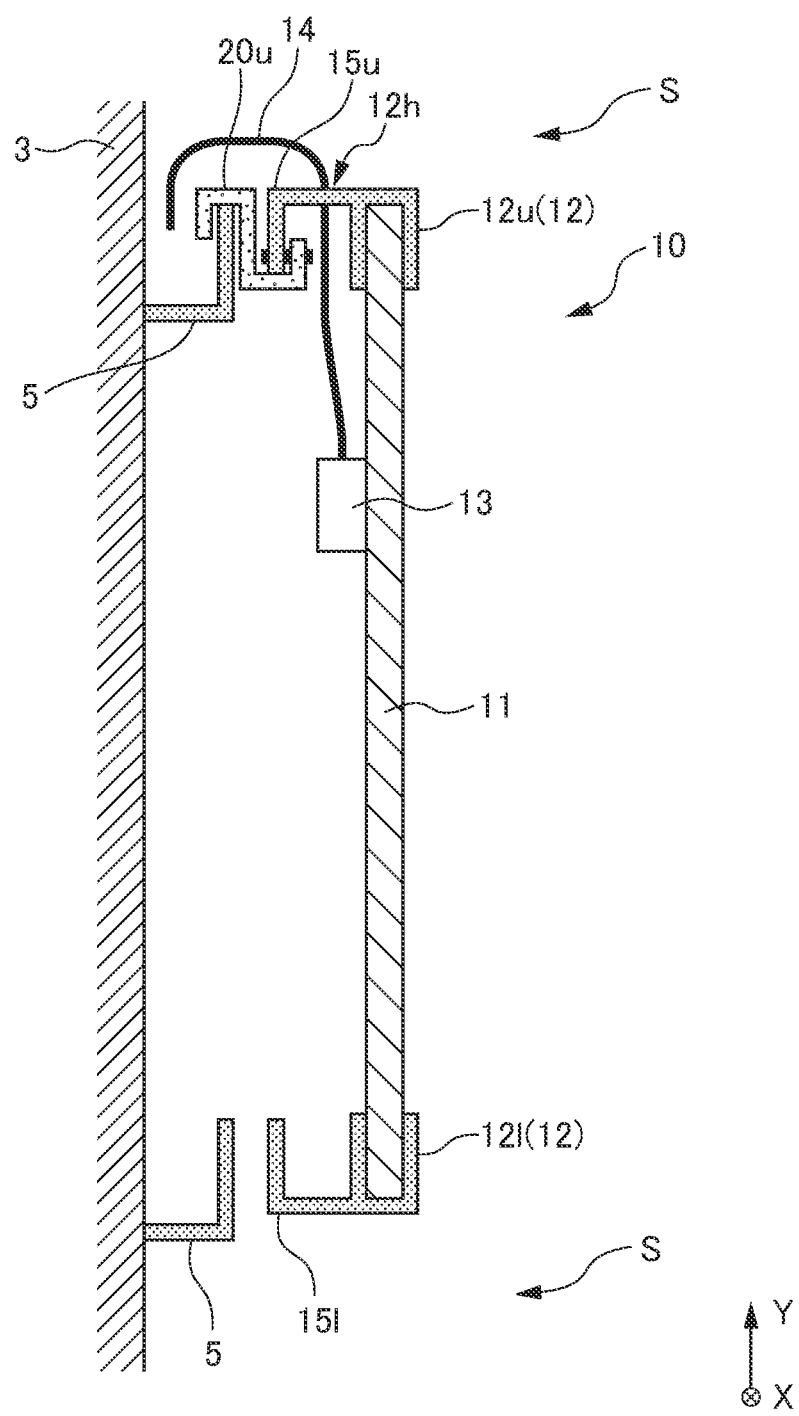
FIG. 11 is a cross-sectional view of an enlarged portion corresponding to FIG. 5 of a solar cell module installation structure according to a variation of the present embodiment.
Figure 12:
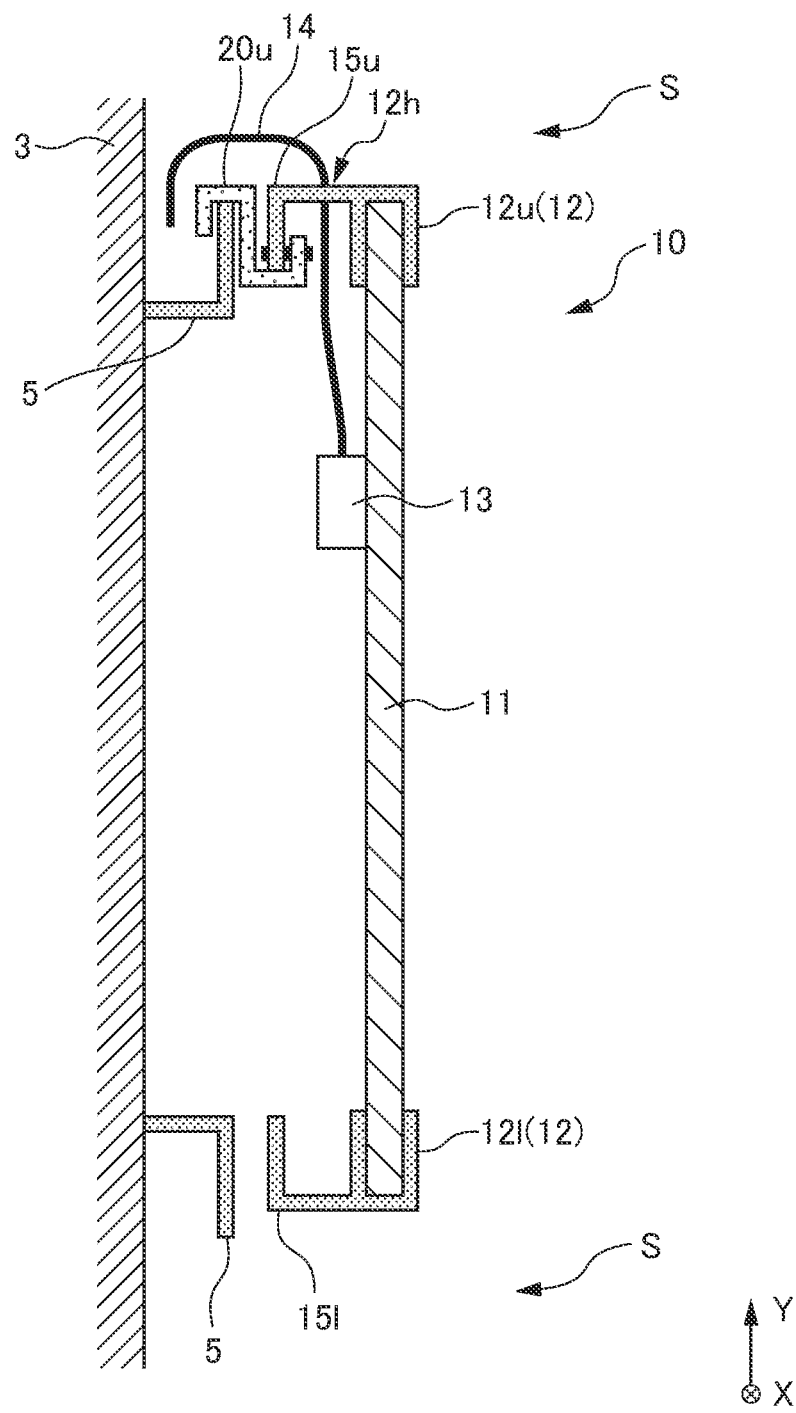
FIG. 12 is a cross-sectional view of an enlarged portion corresponding to FIG. 5 of a solar cell module installation structure according to a variation of the present embodiment.
Figure 15:
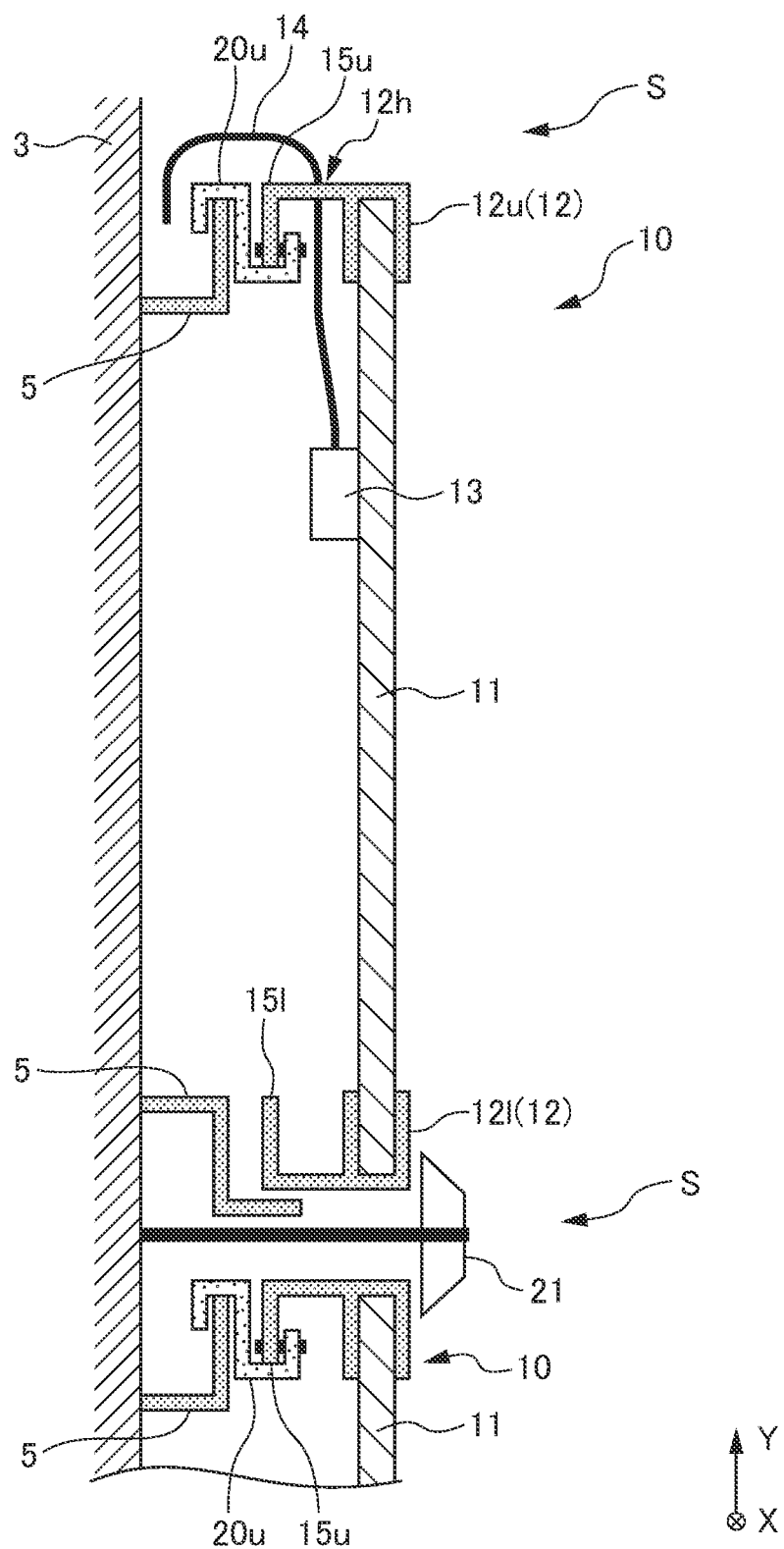
FIG. 15 is a cross-sectional view of an enlarged portion corresponding to FIG. 5 of a solar cell module installation structure according to a variation of the present embodiment.

In addition, in the embodiment described above, a form in which a lower engaging part 151 on a solar cell module 10 is fixed by a lower intermediate member 201 is exemplified, but, as illustrated in FIG. 11, the lower engaging part 151 does not necessarily need to be fixed by a lower intermediate member 201. In this case, if the rigidity of the upper intermediate member 20u is high, it is possible to suppress rotation which is where the lower frame part 121 of the solar cell module 10 separates from the wall surface. In addition, in this case, the horizontal bar 5 corresponding to the lower engaging part 151 may have a hook shape which protrudes on a lower side as illustrated in FIG. 12, or may additionally have a structure for supporting the lower frame part 121 in the solar cell module 10 as illustrated in FIG. 15.

Figure 13:
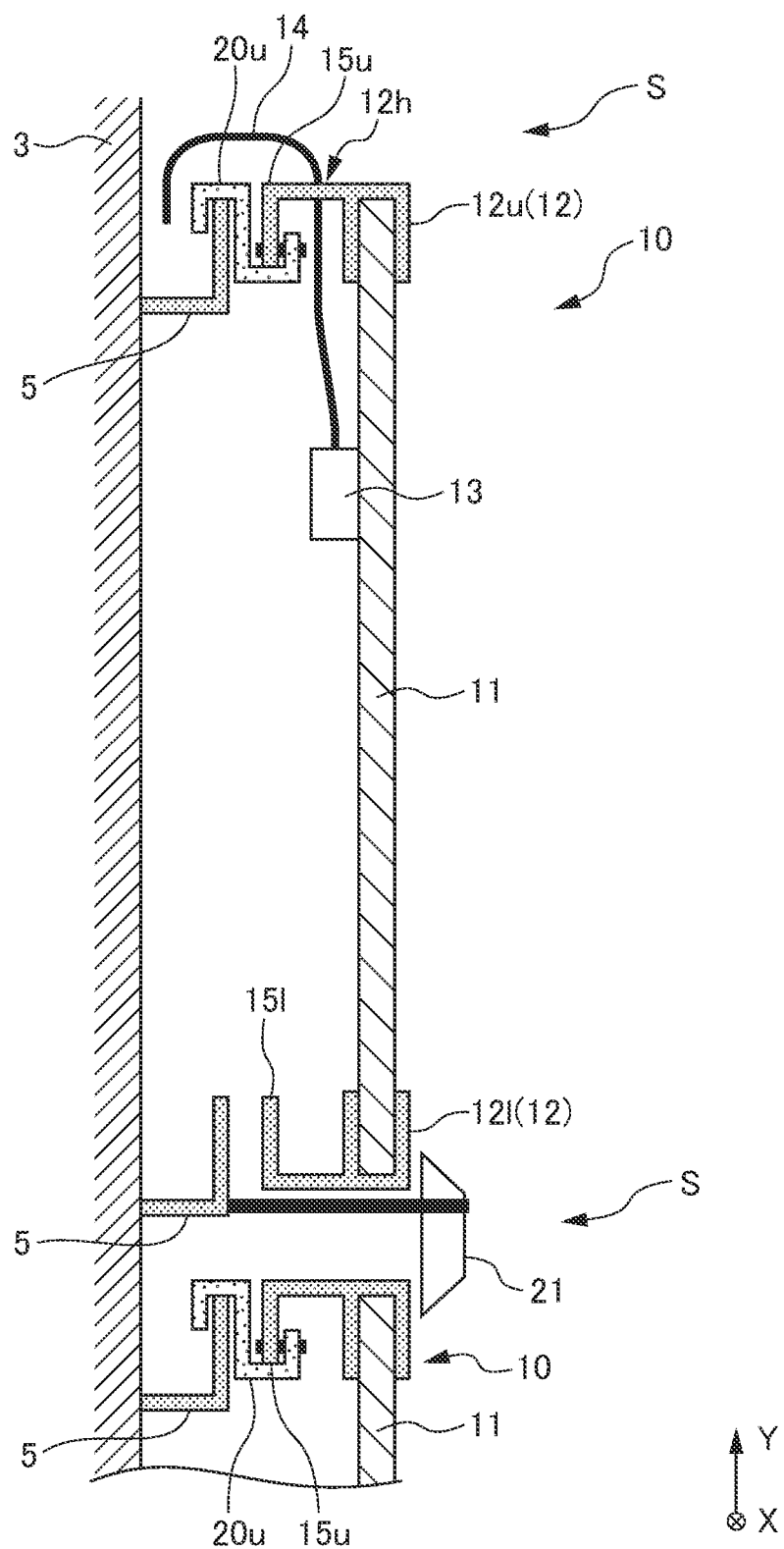
FIG. 13 is a cross-sectional view of an enlarged portion corresponding to FIG. 5 of a solar cell module installation structure according to a variation of the present embodiment.
Figure 14:
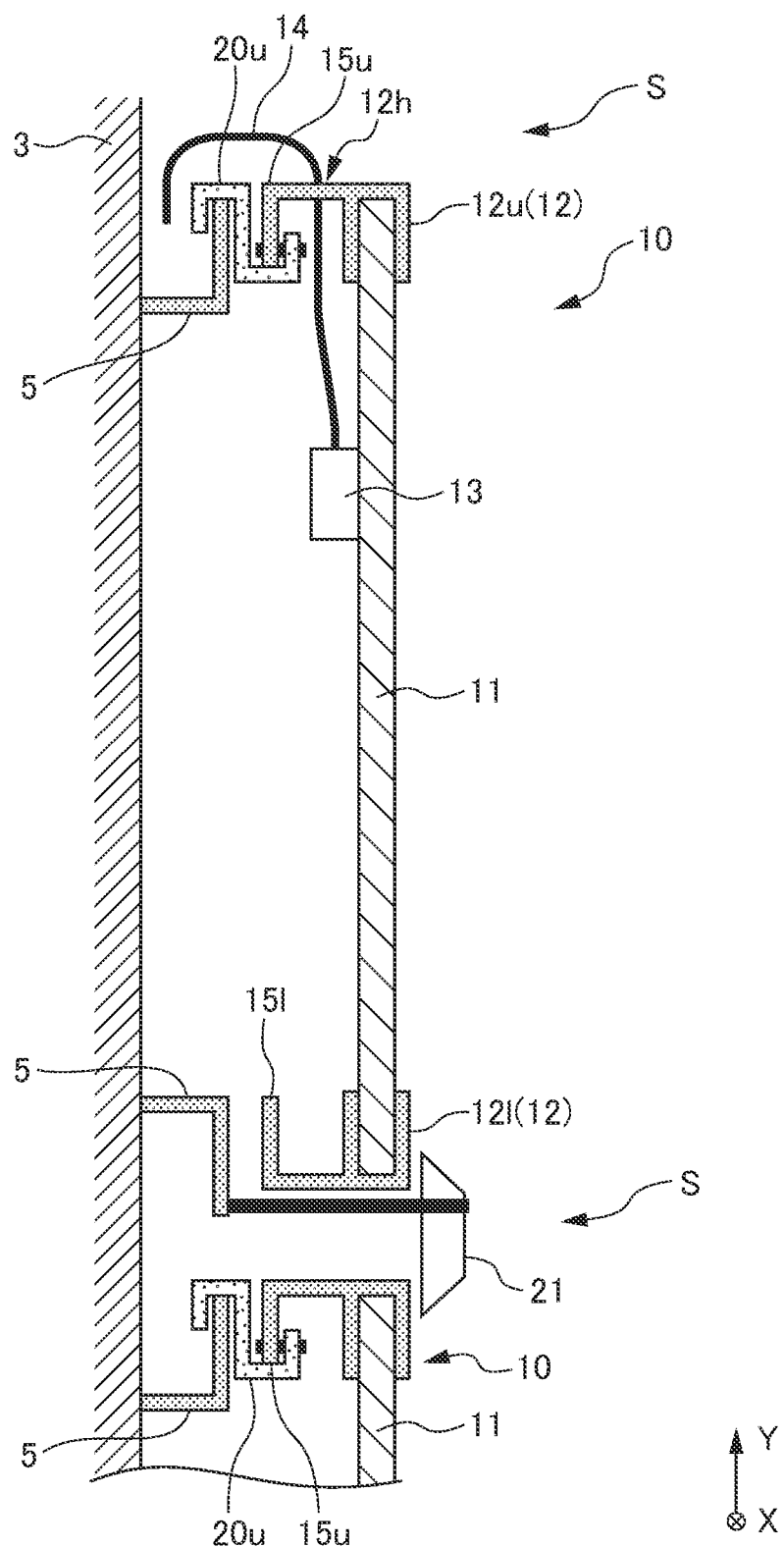
FIG. 14 is a cross-sectional view of an enlarged portion corresponding to FIG. 5 of a solar cell module installation structure according to a variation of the present embodiment.

Alternatively, as illustrated in FIGS. 13 and 14, the lower frame part 121 of the solar cell module 10 may be fixed to a horizontal bar 5 by a fixing member 21 for which a cross-section intersecting the X direction has a T-shape. Alternatively, as illustrated in FIG. 15, the lower frame part 121 of the solar cell module 10 may be fixed to the wall surface 3 by a fixing member 21 for which a cross-section intersecting the X direction has a T-shape. In this case, the fixing member 21 may also serve as a veneer which is for obscuring the space S and is described above.

Figure 16:
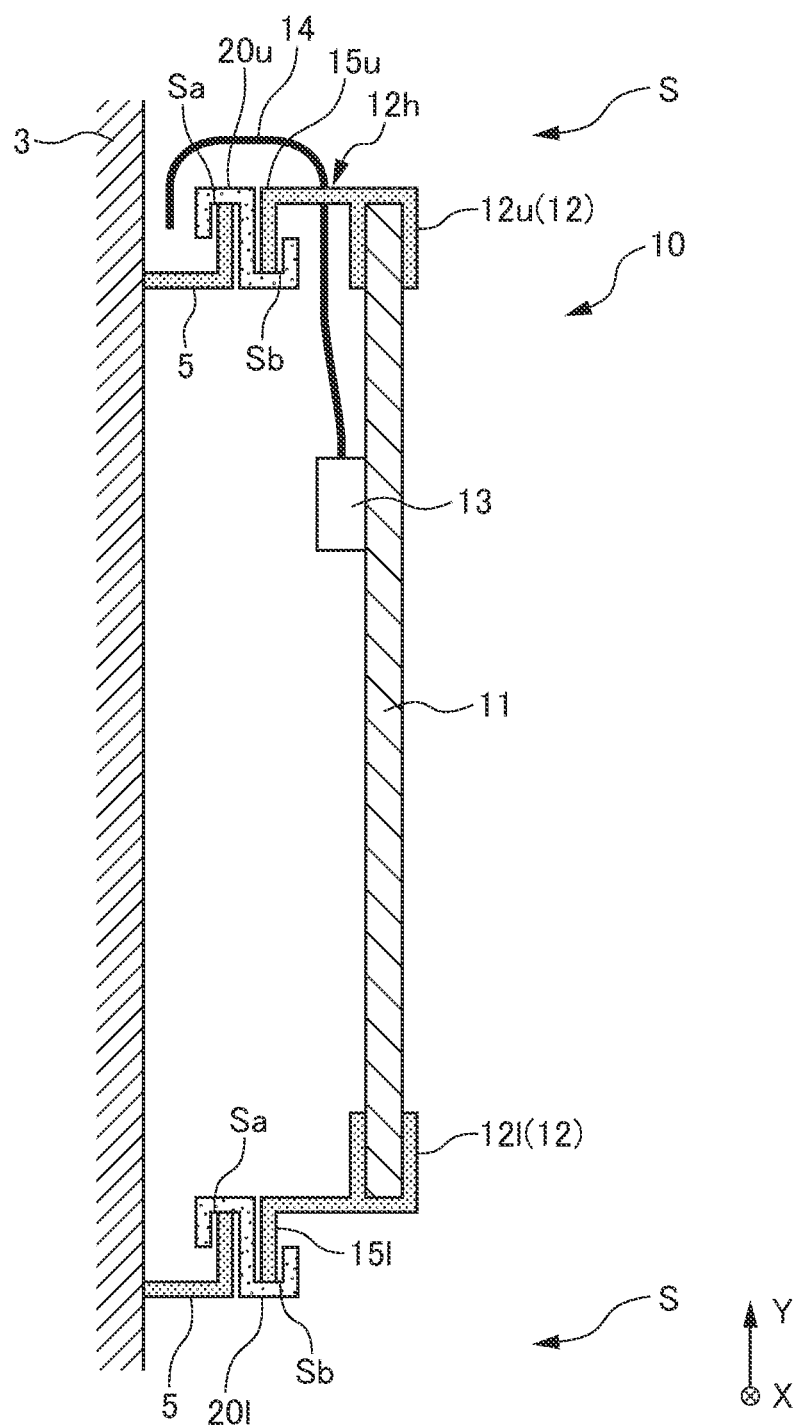
FIG. 16 is a cross-sectional view of an enlarged portion corresponding to FIG. 5 of a solar cell module installation structure according to a variation of the present embodiment.

In addition, in the embodiment described above, a form in which an upper intermediate member 20u and an upper engaging part 15u are fastened together by a screw was exemplified, but, as illustrated in FIG. 16, an upper intermediate member 20u and an upper engaging part 15u do not need to be fastened by a screw. In this case, a surface Sa of the upper intermediate member 20u which comes into contact with the horizontal bar 5 may be formed to be more slippery than a surface Sb on the upper intermediate member 20u which comes into contact with the upper engaging part 15u. The difference in slipperiness between the surface Sa and the surface Sb for example may be realized by surface treatment, may be realized by an attachment such as a sheet, may be realized by an additive such as a lubricating oil, or may be realized by a means such as a pulley. As a result, it is easy for the solar cell module 10 to move in the horizontal direction (X direction). As a result, it is possible to improve the ease of exchanging (in other words, removing and attaching) a type of general-purpose solar cell module which is hooked onto a wall surface.

Similarly, in the embodiment described above, a form in which a lower intermediate member 201 and a lower engaging part 151 are fastened together by a screw was exemplified, but, as illustrated in FIG. 16, a lower intermediate member 201 and a lower engaging part 151 do not need to be fastened together by a screw. In this case, it may be that the lower engaging part 151 has a hook shape which protruded on the upper side similarly to the upper engaging part 15u, and a cross-section of the lower intermediate member 201 intersecting with the X direction has an S-shape, similarly to the upper intermediate member 20u. In this case, as described above, the surface Sa on the lower intermediate member 201 which comes into contact with a horizontal bar 5 may be formed to be more slippery than the surface Sb of the lower intermediate member 201 which comes into contact with the lower engaging part 151.

What is claimed is:

1. A solar cell module installation structure with which a plurality of solar cell modules are two-dimensionally installed onto a wall surface of a construction, the structure comprising:

an engagement part that is configured to attach the plurality of solar cell modules to the wall surface; and a plurality of solar cell modules that are configured for installation onto the wall surface by engaging with the engagement part, wherein each of the plurality of solar cell modules comprises a solar cell panel, a frame that supports a periphery of the solar cell panel, and a cable configured to provide an output from the solar cell panel, the frame including an upper frame part supporting an upper edge of the solar cell panel and a lower frame part supporting a lower edge of the solar cell panel, the upper frame part in the frame has an engaging part configured to engage with the engagement part, the lower frame part in the frame has a hole going through the lower frame part and configured to let out the cable to outside the solar cell module, a space configured to connect and install the cable let out to outside each solar cell module is provided between the upper frame part of a lower solar cell module from among solar cell modules adjacent in a vertical direction and the lower frame part of an upper solar cell module from among the solar cell modules adjacent in the vertical direction.

2. The solar cell module installation structure according to claim 1, wherein the engagement part includes a plurality of horizontal bars configured to attach to the wall surface such that the plurality of horizontal bars extend in a horizontal direction and are separated in the vertical direction, at each of the plurality of solar cell modules, the engaging part in the upper frame part engages with one of the plurality of horizontal bars in a manner that enables the engaging part to move in the horizontal direction.

3. The solar cell module installation structure according to claim 2, wherein each of the plurality of horizontal bars has, protruding on an upper side, a cross-sectional L-shape, a cross-sectional U-shape, or a cross-sectional V-shape, the engaging part in the solar cell module has, protruding on a lower side, a cross-sectional L-shape, a cross-sectional U-shape, or a cross-sectional V-shape.

4. The solar cell module installation structure according to claim 3, further comprising:

one or more intermediate members that have a cross-sectional S-shape or a cross-sectional N-shape and are configured to be interposed between the engagement part on the wall surface and the engaging part in the solar cell module, wherein a surface, on the one or more intermediate members, configured to contact the engagement part is configured to be more slippery than a surface, on the one or more intermediate members, configured to contact with the engaging part.

* * * * *